Oct. 14, 1930.  W. J. CONKIE  1,778,104
PROCESS AND MEDIUM FOR PRODUCING SONG FILMS
Filed April 27, 1928
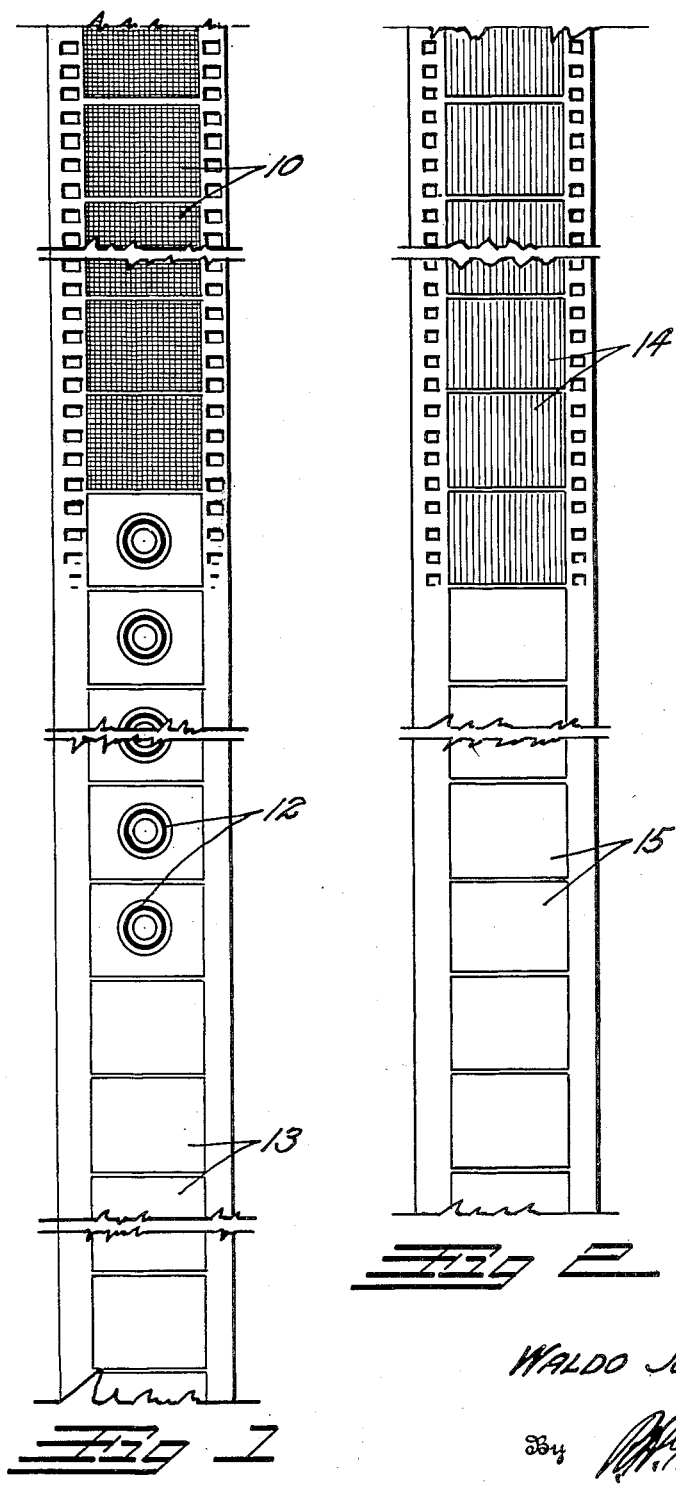
Inventor
WALDO JOHN CONKIE
By
Attorney Patented Oct. 14, 1930

1,778,104

UNITED STATES PATENT OFFICE

WALDO JOHN CONKIE, OF DENVER, COLORADO, ASSIGNOR TO ALEXANDER INDUSTRIES, INC., OF ENGLEWOOD, COLORADO, A CORPORATION OF COLORADO

PROCESS AND MEDIUM FOR PRODUCING SONG FILMS

Application filed April 27, 1928. Serial No. 273,343.

This invention relates to a process and timing film to be used in the production of motion picture films of the type adapted to project the words of a song upon a projection screen in synchronism to music. Such a film is illustrated in my co-pending applications, Serial #251,290 and Serial #273,342.

Films of this character carry the song words or syllables thereof and are designed to project these words while the melody notes to which the words are to be sung, are being played. It is very difficult in producing a film of this character to determine how many frames the film words should occupy in order that the words will follow the music in exact synchronism therewith.

The principal object of this invention is to provide a system and a preliminary timing film, or series of films, by means of which the manufacturer can determine the number of frames to be occupied by the words.

Other objects and advantages will become apparent from the following detailed description in which reference is had to the accompanying drawing which forms a part hereof.

The features of the drawing are referred to in the description by reference numerals.

In the drawing:

Fig. 1 illustrates sections of a motion picture film to be used for timing waltzes and other musical numbers whose tempo is three beats to the measure.

Fig. 2 illustrates sections of a film designed to be used for timing musical numbers having an even number of beats to the measure.

In employing my invention, I prepare two different sets of timing films. The films of one set are designed for odd beat tempos and carry three separate indications, such as illustrated in Fig. 1. The three indications of Fig. 1 are the dark frames 10, the circle frames 12, and the white frames 13. Each film in the odd beat set will carry these indications on a differing number of frames. The other set of films will be designed for even beat time and carry two different indications such as the dark frames 14 and white frames 15 of Fig. 2.

It requires approximately five different films to cover the various tempos in the odd beat set, such as adagio, lento, andante, moderato, vivace, etc. In the even beat set approximately five different films are also required to beat the various tempos such as lento, andante, moderato, allegro, presto, etc.

Each of the various films will carry its indications for a different number of frames. For instance, in the adagio film of the odd beat set the indication 10 will appear for 20 consecutive frames; the indication 12, for 20 frames; and the indication 13, for 20 frames. This sequence of 20 frames each is repeated throughout the length of the film, which should be aproximately 200 feet long. The remaining odd beat films will also contain the indications 10, 12, and 13, but in each film the indications will appear on a different number of consecutive frames as follows:—

Lento _____ 16 frames per indication.
Andante _____ 12 frames per indication.
Moderato _____ 10 frames per indication.
Vivace _____ 8 frames per indication.

The films of the even beat set require only two indications upon the film such as indicated in Fig. 2, by the dark frames 14, and the light frames 15. The number of frames required for the indications 14 and 15, in the even beat set is as follows:—

Lento _____ 20 frames per indication.
Andante _____ 16 frames per indication.
Moderato _____ 12 frames per indication.
Allegro _____ 10 frames per indication.
Presto _____ 8 frames per indication.

The indications shown on the drawing are simply illustrative. Any suitable indication such as numbers or designs can be used as desired.

One method of using my improved timing films is as follows: Let us assume the song to be filmed is a waltz, that is, written to three-four time. The song is first examined to find the measure that has the largest number of independent word or syllable melody notes. It has been determined that it is impractical for an audience, except in the case of very short words, to read words upon a screen if they are projected faster than eight frames to the word. Assuming the song has a measure in which six words or syllables are used, each word or syllable to be sung to a separate quarter note. By allowing eight frames to each note, we determine that it will require 48 frames to the measure or 16 frames to the beat. We, therefore, place the andante or 16 frame, odd beat, timing film upon the projection machine and project this film upon the screen at the average projection speed.

During the projection the song is played and sung while the changing indications 10, 12, and 13, on the screen beat the time for the musician similarly to a metronome. If it is found that the time is too fast for effective singing, the andante film is replaced by the lento or 20 frame film and the music is repeated and sung while this film beats the time.

Should the 20 frame time be found effective, a definite foundation has been laid for producing a song film to accompany the singing or playing of that particular song. We have determined that 60 frames must be allowed for each measure of the song and that each word intended to be sung to a quarter note must appear on 10 consecutive frames, an eighth note word on 20 consecutive frames and a half note on 40, etc.

The complete song film is then prepared allowing the proper number of frames for each word and syllable throughout the song. If it is desired to project complete sentences upon the screen, the sentence will occupy the total number of frames for the total number of notes accompanying that sentence in the song.

If it is desired to use an animated figure to beat the time for the song, such as illustrated in the above noted co-pending application, the movements of the figure can be easily timed for indicating the beat counts. For instance, in the typical andante film described, the figure will require 20 frames to execute a complete movement in order that each movement will occupy the time of one beat.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A method for determining the number of frames to carry song words in a song film so that said words will synchronize with the music of said song comprising: playing said song at a desired tempo; simultaneously projecting uniform time indications from a film in which the time indications bear a definite relation to the number of frames projected at a set uniform tempo upon a screen during said playing; comparing the tempo of the music with the regular tempo indicated upon the screen to determine the proper number of frames required for said song, and recording the results of such comparison in a manner to preserve such results for use in the preparation of said song film.

2. A method for determining the number of frames to carry song words in a song film so that said words will synchronize with the music of said song comprising: playing said song at a desired tempo; simultaneously projecting uniform time indications from a film in which the time indications bear a definite relation to the number of frames projected at a set uniform tempo upon a screen during said playing; counting the number of time indications appearing during the playing of said song; and multiplying the number of time indications which appeared, by the definite number of frames carrying the individual indications on said film to obtain the total number of frames required for the projection of the desired song film.

3. A method for determining the number of frames to carry song words in a song film so that said words will synchronize with the music of said song comprising: playing said song at a desired tempo; simultaneously projecting uniform time indications from a film in which the time indications bear a definite relation to the number of frames projected at a set uniform tempo upon a screen during said playing; counting the number of time indications appearing during the playing of said song; multiplying the number of time indications which appeared, by the definite number of frames carrying the individual indications on said film to obtain the total number of frames required for the projection of the desired song film; thence dividing the total number of frames thus obtained by the total number of beats in said song to obtain the basic number of frames per beat which must be used in the production of said song.

In testimony whereof, I affix my signature.

WALDO JOHN CONKIE.